United States Patent Office 2,992,016
Patented July 11, 1961

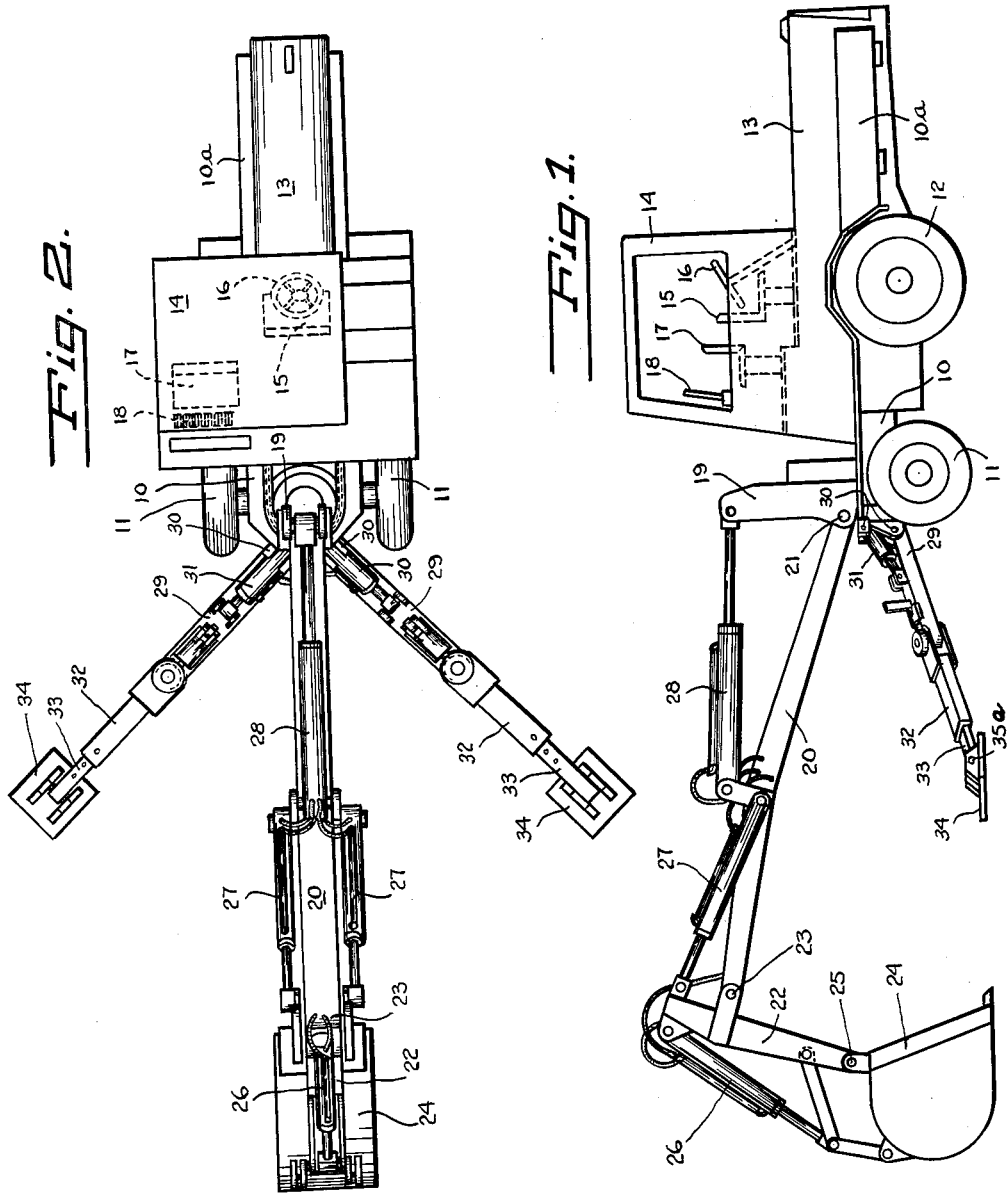

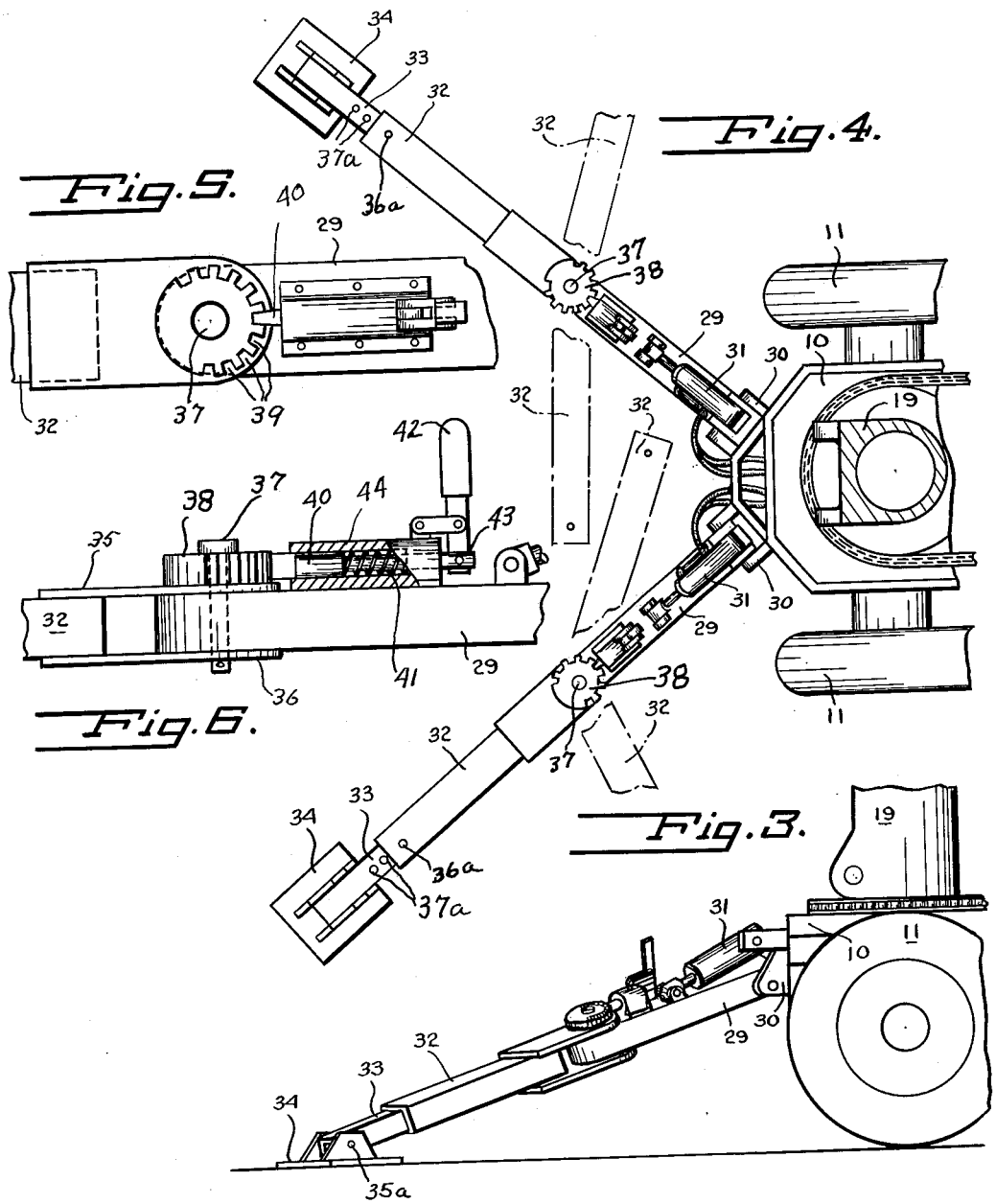

2,992,016
OUTRIGGER OR STABILIZER FOR TRACTORS
John S. Pilch, % Ware Machine Works Inc.,
P.O. Box 140, Ware, Mass.
Filed Feb. 20, 1959, Ser. No. 794,626
7 Claims. (Cl. 280—150.5)

This invention relates to outriggers or stabilizers for tractors having implements or accessories mounted thereon or the like, and has particular reference to a new and improved form of outrigger or stabilizer that may be adjusted to best position for supporting the vehicle during use of the implement and out of interfering position during travel of the vehicle.

The object of the invention is to provide a new and improved multiple position outrigger or stabilizer for the purpose set forth.

Other objects and advantages of the invention will be apparent from the following description taken in connection with the accompanying drawings.

Referring to the drawings:

FIG. 1 is a side view of a tractor having an implement attached thereto and embodying the outriggers or stabilizers of the present invention;

FIG. 2 is a top or plan view of the apparatus shown in FIG. 1;

FIG. 3 is a fragmentary side view generally similar to FIG. 1, but showing the outrigger on a larger scale;

FIG. 4 is a fragmentary top or plan view generally similar to FIG. 2, but showing the outriggers on a larger scale;

FIG. 5 is a fragmentary top view of one of the outriggers; and

FIG. 6 is a fragmentary side view of the outrigger shown in FIG. 5.

Referring more particularly to the drawings wherein similar reference characters designate corresponding parts throughout, the invention is shown applied to a tractor comprising a tractor frame 10 supported on axles mounted on spaced sets of wheels 11 and 12 and wherein the tractor frame 10 has an extension portion 10a extending and suspended beyond the wheels 12 and supporting the tractor engine or power plant 13.

On the tractor is provided the cab 14 in which is positioned the operator seat 15 and steering wheel 16 for use during movement of the vehicle and operator seat 17 and control valves 18 for use during operation of the implement.

The implement shown by way of illustration is a trencher comprising a support 19 extending upwardly from the tractor frame and to which is pivotally mounted the boom 20 by the pivot 21.

At the free end of boom 20 is pivotally mounted the dipper stick 22 by pivot 23 and dipper stick 22 carries bucket 24 which is pivotally mounted thereon at 25.

The bucket is adapted to be pivoted relative to dipper stick 22 by means of hydraulic jack 26 and dipper stick 22 is adapted to be pivoted relative to boom 20 by means of hydraulic jack 27.

The boom 20 is adapted to be raised and lowered by means of hydraulic jack 28 which is connected at its opposite ends to boom 20 and the upper end of support 19.

The outriggers or stabilizers shown comprise first portions 29 pivotally mounted on tractor frame 10 by horizontal pivots 30 and are adapted to be raised and lowered by means of double-acting hydraulic jacks 31.

Adjacent the outer or free end of portion 29 is pivotally mounted the tubular portion 32 adapted to receive portion 33 carrying the ground engaging pad 34 which is pivotally connected to the portion 33 by the pivot 35a.

The portion 33 may be adjusted relative to portion 32 and locked in adjusted position by means of pins extending through opening 36a in portion 32 and any of the openings 37a in portion 33 when said openings are in aligned relation.

The pivot connections between the portions 32 and 31 allow the pivotal motion of the portions 32 and 29 toward each other, whereby the outriggers may be pivoted to a position within the width of the vehicle for travel so that the outriggers will not extend out beyond the sides of the vehicle during travel, but may be adjusted toward the rear of the tractor for digging or loading at the rear of the tractor or toward the side of the tractor for side digging or loading.

The outriggers preferably extend laterally from the tractor frame 10, as shown in FIGS. 2 and 4.

The pivot connection between the portions 29 and 32 comprises upper and lower plates 35 and 36 respectively secured to an end of portion 32 or portion 29 and extending outwardly therefrom. In the illustration shown, the plates 35 and 36 are secured to the end of portion 32 and are adapted to receive the end of the first portion 29, which is pivotally connected to the plates 35 and 36 by means of the pivot pin 37 which extends through aligned openings in first portion 29 and plates 35 and 36.

On plate 35 is provided the locking member 38 having a series of slots or openings 39 adapted to receive a key or locking member 40 whereby the locking member 40 may be positioned in any of the slots 39 to retain the first portion 29 in adjusted angular relation with second portion 32.

Locking member 40 is normally retained in one of the slots 39 by spring 41 and may be withdrawn from a slot by handle member 42 to which locking member 40 is pivotally connected at 43.

The locking member 40 extends through an opening in housing 44 in which is positioned spring 41.

The locking member could be on either of the first or second portions 29 or 32 and the member 38 would then be located on the opposite side of said members.

In operation, the locking member 40 may be retracted by handle 42 to allow the pivoting of the second portion 32 to a position within the outline of the vehicle for travelling and may be adjusted to desired angular relation for stabilizing the vehicle during operation of the implement.

The hydraulic jack 31 serves to adjust the height of the outrigger and also to hold it in raised position during travelling.

In FIG. 4 the second portion 32 is shown in broken lines in a position within the outline of the vehicle for travelling and positioned outside of the line of vehicle for stability of the vehicle such as during digging or loading with the implement at a point on the side of the vehicle.

From the foregoing it will be seen that I have provided new and improved means for obtaining all of the objects and advantages of the invention.

I claim:

1. In a device of the character described, a tractor frame, stabilizing means pivotally connected adjacent one end to said tractor frame, said stabilizing means having a first portion serving to stabilize said tractor during the use of a tractor mounted implement, and a second portion pivotally connected to said frame by a substantially horizontal pivot, said first portion being pivotally connected to said second portion connected to the tractor frame by substantially vertical pivot means and a ground engaging pad pivotally connected to said first portion.

2. In a device of the character described, a tractor frame, stabilizing means pivotally connected adjacent one end to said tractor frame, said stabilizing means having a first portion serving to stabilize said tractor during the use of a tractor mounted implement, and a second portion pivotally connected to said frame by a substantially horizontal pivot, said first portion being pivotally connected to said second portion connected to the tractor frame by substantially vertical pivot means and hydraulic means connected adjacent its opposite end to said stabilizing means and said tractor frame for raising and lowering said stabilizing means relative to said tractor frame, about said horizontal pivot, and a ground engaging pad pivotally connected to said first portion.

3. In a device of the character described, a tractor frame having a stabilizer having a first portion pivotally connected to said frame by a substantially horizontal pivot, said stabilizer having a second portion having supporting means adapted to rest on the ground to stabilize said tractor, said second portion being pivotally connected to said first portion by a substantially vertical pivot said supporting means of said second portion comprising a ground engaging pad pivotally connected to said second portion.

4. In a device of the character described, a tractor frame having a stabilizer having a first portion pivotally connected to said frame by a substantially horizontal pivot, said stabilizer having a second portion having a ground engaging pad adapted to rest on the ground to stabilize said tractor, said second portion being pivotally connected to said first portion by a substantially vertical pivot and a longitudinally extensible portion adjustably connected to said second portion.

5. In a device of the character described, a tractor frame, a stabilizer having a first portion pivotally connected to said frame by a substantially horizontal pivot and a second portion pivotally connected to said first portion by a substantially vertical pivot, and means whereby the angular relation between said first and second portions may be adjusted about said vertical pivot and a ground engaging pad carried by said second portion.

6. In a device of the character described, a tractor frame, a stabilizer having a first portion pivotally connected to said frame by a substantially horizontal pivot and a second portion pivotally connected to said first portion by a substantially vertical pivot, and means whereby the angular relation between said first and second portions may be adjusted about said vertical pivot, and hydraulic means connected adjacent its opposite ends to said first portion and said tractor frame for lifting said stabilizer relative to said tractor frame and a ground engaging pad carried by said second portion.

7. In a device of the character described, a tractor frame, a stabilizer having a first portion pivotally connected to said frame by a substantially horizontal pivot and a second portion pivotally connected to said first portion by a substantially vertical pivot, and means whereby the angular relation between said first and second portions may be adjusted about said vertical pivot, said means comprising interengaging locking means allowing the adjustment of said first and second portions to desired relative position and whereby said portions may be locked in adjusted position and a ground engaging pad carried by said second portion.

References Cited in the file of this patent

UNITED STATES PATENTS

| 1,519,117 | Cochran | Dec. 16, 1924 |
| 2,436,799 | Frost | Mar. 2, 1948 |
| 2,750,204 | Ohrmann | June 12, 1956 |
| 2,870,924 | Wills | Jan. 27, 1959 |

FOREIGN PATENTS

| 673,782 | France | Oct. 14, 1929 |
| 835,190 | Germany | Mar. 27, 1952 |